J. H. SIFERS.
End-Gate for Wagons.
No. 212,991. Patented Mar. 4, 1879.
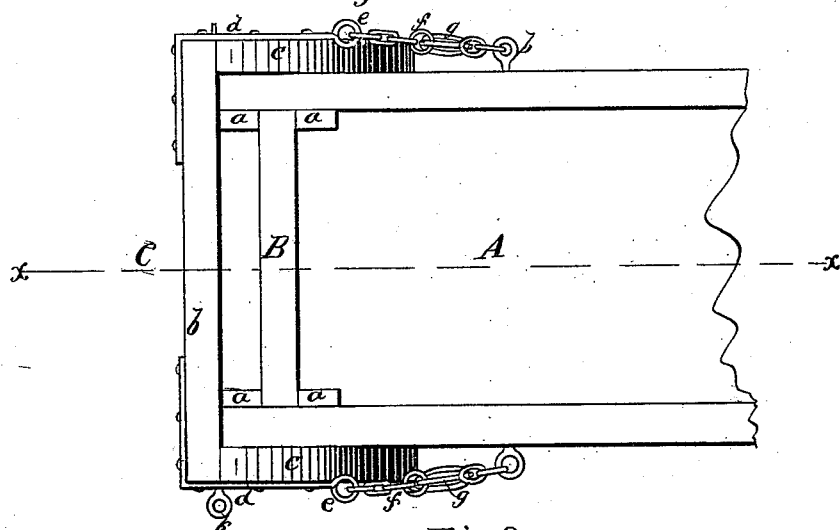
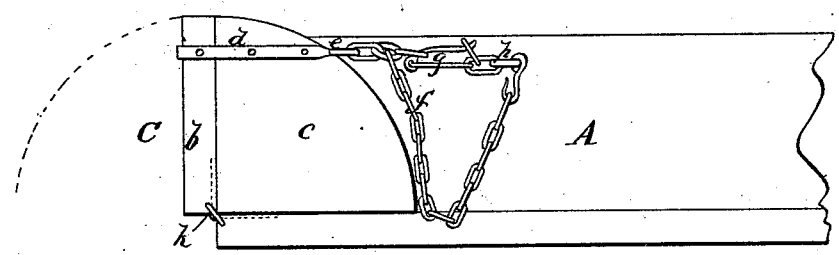
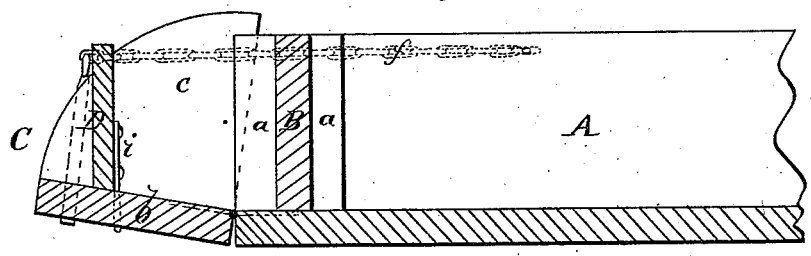
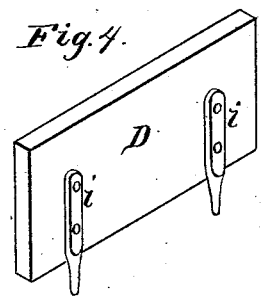
WITNESSES:
Henry N. Miller
C. Sedgwick
INVENTOR:
J. H. Sifers
BY Munn & Co
ATTORNEYS.

UNITED STATES PATENT OFFICE.

JAMES H. SIFERS, OF LA CYGNE, KANSAS.

IMPROVEMENT IN END-GATES FOR WAGONS.

Specification forming part of Letters Patent No. 212,991, dated March 4, 1879; application filed September 30, 1878.

*To all whom it may concern:*

Be it known that I, JAMES H. SIFERS, of La Cygne, in the county of Linn and State of Kansas, have invented a new and Improved End-Gate for Wagons, of which the following is a specification:

The object of this invention is to provide an end-gate for wagons which, when opened, will catch the loose material composing the load as it falls down, and thus prevent it from falling to the ground, and which can also be quickly and easily converted into a trough for the horses to eat their food from.

It consists of a gate hinged to the edge of the bottom of the wagon and provided with end pieces or sides, said gate, when traveling, being swung up against the ends of the wagon body or box and secured by chains; but when the wagon is about to be unloaded it is let down, and forms a continuation of the wagon-box, and the loose material falling down is caught in the gate instead of falling to the ground.

In the accompanying drawings, forming part of this specification, Figure 1 is a top view of a wagon-box with my end-gate attached and closed up. Fig. 2 is a side elevation of the same. Fig. 3 is a longitudinal section with gate open. Fig. 4 is a detachable board for converting the gate into a trough.

Similar letters of reference indicate corresponding parts.

Referring to the drawings, A represents a section of a wagon-body, the rear end of which is provided with an ordinary tail-board, B, secured in cleats *a a*, fixed to the wagon-body on either side. This tail-board is not to be used, except as hereinafter described, unless the gate is dispensed with.

C is the end-gate. It is composed of the board *b*, hinged on one edge to the bottom of the wagon-box, and at each end provided with a side, *c*, in the form of a quadrant of a circle. Metal clamps *d d* secure these sides and the bottom board *b* together, the clamps terminating in rings *e*, to which chains *f* are attached, which are used to hold the gate in position. When the gate is closed up a hook, *g*, attached to the ring-bolt *h*, engages one of the links of the chain, and when it is down the chain is drawn out and bears up the gate, so as to relieve the hinges from bearing the weight of all the material that may be placed on the gate. The manner of securing the gate when closed is clearly shown in Figs. 1 and 2, while the manner in which it is supported by the chains when open is as clearly shown in Fig. 3.

The operation of this part of my invention is as follows: When the wagon is about to be loaded with loose material, such as coal, grain, &c., the gate is turned up, with its bottom *b* resting against the ends of the side-boards of the wagon-body and secured in this position, as shown in Figs. 1 and 2.

When the wagon is about to be unloaded, the gate C is let down in a horizontal position, where it is supported by the chains, in the manner shown in Fig. 3, and the contents of the wagon (if corn, coal, potatoes, or anything of similar nature) fall down and rest in the gate, which thus forms an extension of the wagon-body, and are caught there, instead of falling to the ground, as in wagons of the old construction, and they can be shoveled out the same as from the wagon-body itself.

In traveling to a distance the horses have to be fed on the road, and it is usual to carry a separate trough or box for this purpose; but by means of my improved end-gate I am enabled to construct a trough easily and quickly. For this purpose I provide a board, D, as long as the distance between the side pieces on the inside, and to this board I attach two or more metal straps, *i*, terminating in pins projecting beyond the edge of the board. The width of this is about equal to the depth of the wagon-body, though this is not essential. In the bottom *b* of the gate are made holes corresponding to the number of pins on the board.

When it is desired to prepare the food for the horses, the gate is let down to a horizontal position, the tail-board B put in place, and the board D placed in it, with its lower edge resting on the bottom and the pins inserted in the holes, as clearly shown in Fig. 3, and thus a trough is formed from the end-gate board D and tail-board B, in which the food can be placed the same as in a separate trough, and in a much more convenient manner. The board is the only separate detached part that has to be carried, and it can be readily stowed away when not in use.

The end-gate need not always be attached to the wagon. When it is desired to remove it the rod $k$, forming the pintle of the hinges connecting the gate to the wagon-body, is withdrawn, the chain unhooked, and the gate removed. When hauling some things—as hay, for instance—the gate is of no use, and it is removed, if desired, without trouble.

Having thus described my invention, I claim as new and desire to secure by Letters Patent—

1. The chains $f$ and hooks $g$, in combination with the clamps $d$ of the end-gate, substantially as and for the purpose described.

2. The end-gate C, provided with the removable board D, in combination with the wagon-body, substantially as and for the purpose described.

JAMES HARVEY SIFERS.

Witnesses:
J. V. DONALDSON,
B. F. SMITH.